May 29, 1956  E. W. SMITH  2,747,710
VARIABLE SPEED DRIVE
Filed Aug. 30, 1950
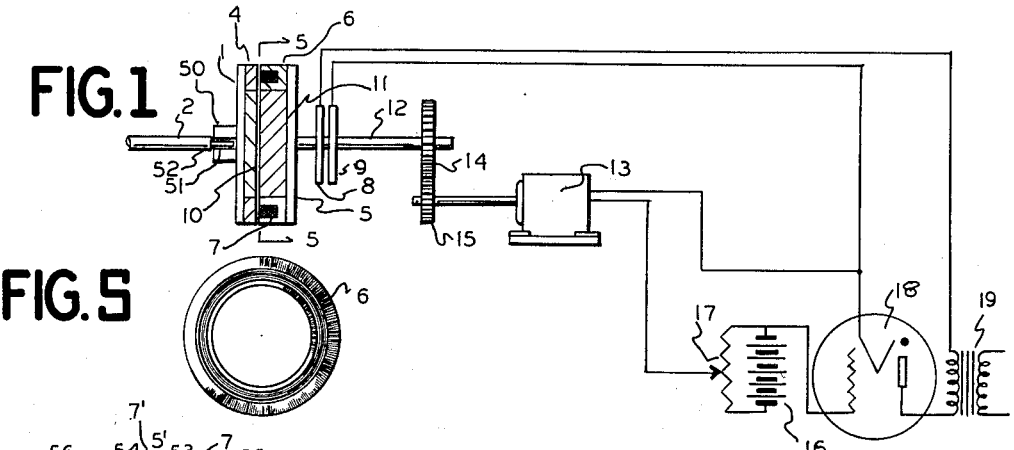
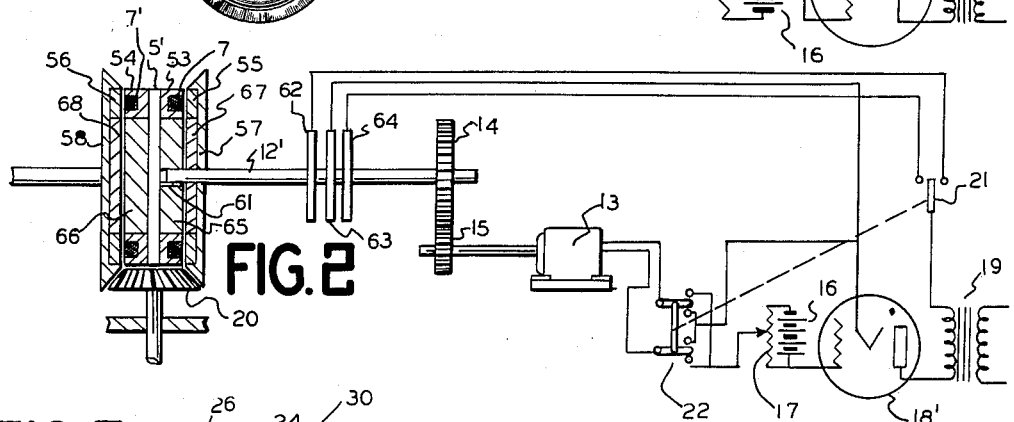
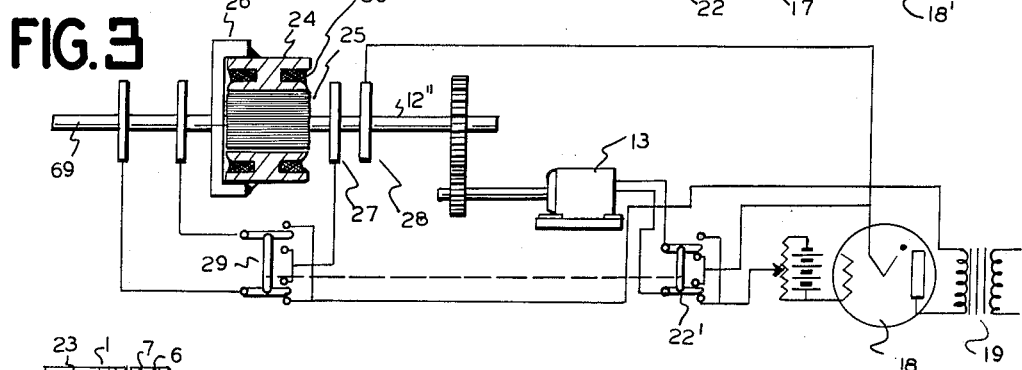
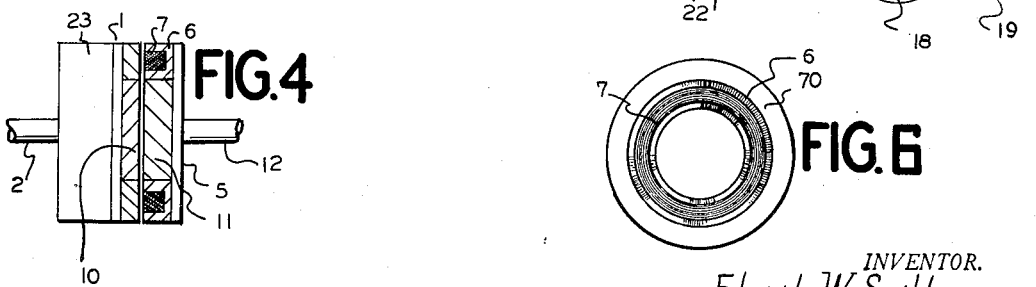
INVENTOR.
Edward W. Smith
BY
his Attorney

United States Patent Office 2,747,710
Patented May 29, 1956

2,747,710

VARIABLE SPEED DRIVE

Edward W. Smith, Melrose Highlands, Mass.

Application August 30, 1950, Serial No. 182,239

2 Claims. (Cl. 192—84)

The present invention relates to improvements in variable speed drives and, more particularly to improvements in electronic variable speed drives.

While there are many variations of electronic variable speed drives perhaps the best and most flexible involve the use of a direct current motor the armature of which is connected in series with a "thyratron" tube to the alternating current line, the grid voltage on the "thyratron" being used in conjunction with a reference voltage to control the speed of rotation of the motor.

If such a circuit is examined critically, it will be noted that it has a number of limitations which become rather serious particularly when outputs of more than 2–3 H. P. are under consideration. In fact the mere mention of the H. P. output brings up one of these limitations since the rated horsepower output is only obtained at the maximum speed of the motor as will presently appear and at lower speeds the H. P. output is proportionally reduced.

The limitations just referred to may be listed as follows:

1. Necessity for the use of a D. C. motor.
2. Multiplicity of vacuum tubes required.
3. Physical size of the complete equipment.
4. Excessive cost of achieving more than 2–3 H. P. output.

In analyzing the basic principles of operation of such a circuit, as has been mentioned above, and disregarding such embellishments as current limiting circuits and the like, it will be noted that essentially such an arrangement consists of a source of power, represented above by the A. C. line, and a means of tapping this source of power at frequent intervals of controlled duration. The duration and frequency of tapping, when integrated, represents the power which is drawn from the line to meet the needs of the variable speed output.

In the present invention the fundamental advantages of the above system are retained while the undesirable and expensive expedients which are currently employed to tap a source of power at frequent intervals and for controlled intervals to obtain a variable speed output are avoided.

The present invention, therefore, has for its purpose the provision of a novel method and means for tapping a source of power at rapid intervals and for controlled durations in order to obtain a variabe and controllable speed of rotation of a shaft. It has further the purpose of accomplishing this without the necessity for the use of the usual D. C. shunt motor. It has a further purpose of doing this in such a manner than a thyratron tube or similar rectifying agency employed to control the power pulsations need carry only control currents and not necessarily the full load line current of the motor. It has also the purpose of eliminating the necessity for current limiting circuits such as are desirable if not absolutely necessary in currently existing electronic variable speed drives. It has also for its purpose the provision of a method and means of providing an available torque at the output shaft which is inversely proportional to the speed, i. e. constant horsepower output, and without the use of gears. It has further for its purpose the provision of these features in an economical manner as will presently appear.

The present invention will be more fully described in the specification below in connection with the drawings illustrating an embodiment thereof in which:

Figure 1 shows diagrammatically an embodiment of the invention, partly in section.

Figure 2 shows a modification of the arrangement shown in Figure 1, partly in section.

Figure 3 shows a still further modification of the arrangement of Figure 1, partly in section.

Figure 4 shows a modification of a detail of Figure 1.

Figure 5 shows a section on the line 5—5 of Figure 1, and

Figure 6 shows a similar section as in Figure 5 but of a still further modification of the detail of Figure 5.

The principle of operation of one embodiment of the present invention can perhaps best be understood by reference to the schematic arrangement in Figure 1 where, it will be noted, a disk 1 is rotated on shaft 2 by a prime mover not shown which may be an induction motor of appropriate capacity, a steam or gasoline engine or the like.

Around the periphery of a disc 1 is secured by welding or other suitable means a series of closely packed and radially located laminations 4 forming an annular surface and serving as an armature. The disc 1 is mounted for a small axial movement along the shaft 2 by any suitable means which as indicated in Figure 1 by means of a collar 50 surrounding the shaft 2 which is provided with a slot 51 adapted to receive the key or projection 52 projecting from the shaft 2. The collar 50 is rigidly attached to the disc 1. On a similar disc 5 which is secured to a shaft 12, is similarly mounted by welding or other means about its periphery a series of U-shaped laminations extending radially in line with the axis of rotation of the disc 5 of the shaft 12. These laminations form the annular or ring as indicated more clearly in Figure 5. A coil 7 is located in a slot formed by the block of U-shaped laminations and this coil may be energized through slip rings 8 and 9 which are secured to the shaft 12. Figure 1 shows the disc 1 and armature formed thereon as slidable slightly on the shaft 2 and the disc 5 and the U-shaped laminations as fixed to the shaft 12, but the arrangement may be reversed and the armature may be fixed with the coil and U-shaped laminations movable axially with the disc 5. Within the annular formed by the series of laminations 4 is a frictional surface member 10 which may have its surface continuous and level with the surface of the laminations 4. Mounted on the disc 5 is an opposing frictional member 11 providing a frictional surface which may be substantially continuous with the surface of the U-shaped laminations. These members 10 and 11 may be made of metal or non-metallic materials providing gripping and frictional engaging surfaces when the armature and magnet formed by the U-shaped coils are drawn to one another.

If now the disc 1 is rotated with the frictional surface 10 close to or even slightly touching the opposing surface 11 but insufficiently to transmit any appreciable power, then when the coil 7 is energized, discs 1 and 5 are effectively locked together through the frictional surfaces 10 and 11 and the speed of rotation of the shaft 12 as well as the amount of power transmitted to it will be a function of the duration and strength of the magnetic field and the coefficient of friction involved.

Considering Figure 1 still further, it will be noted that a small pilot D. C. generator 13 is coupled by any suitable means such as gears 14 and 15 to shaft 12. The output voltage of generator 13 is connected in series with a constant source of D. C. potential 16 via potentiometer 17 in such a way that the voltage developed by generator 13 opposes the voltage of the potentiometer 17 the above series arrangement being so connected that with generator 13 stopped any voltage across potentiometer 17 will be such as to make the grid of the "thyratron" or gaseous discharge tube 18 positive with respect to the cathode.

When the above situation obtains, coil 7 will be traversed by a pulsating current corresponding to half wave impulses of the frequency of the supply line voltage delivered through transformer 19. The energization of coil 7 will thus bring about a series of momentary tight closures between friction surfaces 10 and 11, and shaft 12 will begin to rotate as a result of the torque thus applied. When this occurs generator 13 will begin to rotate and a voltage will be generated which will tend to oppose the voltage across potentiometer 17. As the speed continues to rise eventually the voltage of generator 13 will nullify the voltage of potentiometer 17 and the positive potential on the grid will be reduced to zero or may even become negative. When this occurs further, the gaseous discharge tube ceases to fire and energization of coil 7 ceases and no more torque impulses are transmitted to shaft 12 until its speed of rotation falls to the point where the voltage of generator 13 ceases to dominate the potential of potentiometer 17, and the grid becomes sufficiently positive again to permit current to flow through the gaseous discharge tube 18 and energization of coil 7 is resumed. Therefore, in effect, the speed of rotation of shaft 12 is determined by the setting of potentiometer 17.

It will be noted that the above arrangement uses control currents only and not load currents in the "thyratron" and consequently current limiting circuits are unnecessary because excessive loads on shaft 12 can never cause excessive currents to flow in the plate circuit of the thyratron as would be the case with the usual "thyratron"-D. C. motor arrangement where full armature current is usually carried by the "thyratron." It will further be noted that in the present invention much more sensitive control of torque impulses is obtained because the torque impulses transmitted to shaft 12 are proportional to the square of the "thyratron" plate current, up to the saturation point of the iron in the magnetic circuit 4—5. This is true because the pull across the gap is proportional to the square of the flux density which in turn is substantially proportional to the current in coil 7, other factors being the same.

The arrangement by which reversal of direction of rotation of the driven shaft 12 may be obtained is shown schematically in the embodiment in Figure 2. In this instance the stator elements 53 and 54 respectively of the magnetic circuit are arranged in duplicate on opposite sides of plate 5' and are oppositely positioned to the armature elements 55 and 56 fixed on the driving plates 57 and 58, 58 being driven in the opposite direction to 57 by means of the bevel gear 20 engaging with either of the bevel gears 59 and 60 respectively on the peripheral edge of the driving plates 57 and 58. The stator element 53 is free to move along the axis of shaft 12' by means of splines 61 so that depending on whether the stator element engages with plates 57 or 58 it will drive shaft 12 in one direction or the other.

It will be noted that the conductors to the two coils 7 and 7' are brought out to three slip rings 62, 63, 64 instead of two so that in conjunction with switch 21 the plate current of the "thyratron" tube 18 may be used to energize either coil 7 or 7' thus bringing about a rotation of shaft 12' in whichever direction is desired. The sections 65 and 66, within the stator 53 and 54 engage respectively with the sections 67 and 68 within the armature elements 55 and 56 as the stator elements are energized similarly as in Fig. 1. A reversing switch 22 working simultaneously with switch 21, serves to reverse the polarity of the voltage from generator 13 so that it will always supply voltage of the proper polarity to the grid control circuit of the "thyratron" 18' corresponding to 18 of Figure 1.

Mention has already been made to the fact that the present invention makes possible a constant horsepower output from shaft 12 and does so in a novel and effective manner. For the sake of simplicity it will be here described in connection with a non-reversible output shaft rotation although it will be obvious that it is equally applicable to the reversing case. Referring to Figure 4, the back of plate 1 is fitted with an inertia element 23 which rotates with it on shaft 2 and at the same speed.

The rotational kinetic energy resident in such an element may be expressed by the equation $$K.E. = J_m \frac{\omega^2}{2}$$

where $J_m$ is the intertia of the element 23 and $\omega^2$ is the square of its angular velocity in radians. As is well known, an amount of energy can be withdrawn from such a rotating element which is equal to $T\phi$ where $T$ is the torque delivered and $\phi$ the angle in radians through which torque is delivered.

Consequently since the extracted energy is a product of the torque and the angle through which this torque is applied the torque and the angle become inversely proportional for a given amount of energy delivered. Let us now suppose that shaft 2 in Figure 1 is fitted with such an inertia element and the potentiometer 17 is set at a position corresponding to ½ the maximum speed of rotation, for instance. With the usual type of electronic variable speed drive where the armature current to a D. C. shunt motor is supplied through a "thyratron" tube such a speed means that the power output is automatically reduced by ½ also, since neither the "thyratron" nor the motor armature can handle more than full load current.

In the case of the present invention, however, this is not the case because the current carried by the "thyratron" is only the control current and not the load current. Therefore in the present invention if the shaft 12 is loaded to full horsepower output but at ½ maximum speed the shaft torque automatically increases by a factor of 2. It is readily possible for this increased torque to be delivered because although the inertia element may, and probably would be, rotated at constant speed by the prime mover, the driven plate 5 is not, in the case under consideration. Therefore, if the load on shaft 12 running at half speed is raised to full load power output the shaft 12 tends to slow up slightly reducing the voltage output of pilot generator 13 which in turn permits current to flow for a longer time in coil 7 thereby increasing the time of contact between friction surfaces 10 and 11. The additional torque required is thus obtained from the inertia element 23.

In practice the size of the inertia element is determined by the power requirements of the system and the speed regulation desired. As an example, let it be assumed that a 1 horsepower output is required, and that this output be independent of the output speed and that the delivery of power at this rate will not cause more than a one part in 30 drop in speed of the driving shaft. The inertia required in element 23, neglecting the inertia of the prime mover, can be determined as follows. Since 1 H. P. corresponds to 550 ft. lbs./sec. this amount of energy must be delivered by the inertia element. Suppose it is further assumed that the prime mover will be rotating the inertia element at a no load speed of 1800 R. P. M. and, as assumed above the full load speed will be 1740 R. P. M., or respectively 30 R. P. S. and 29 R. P. S. Then $$550 = \frac{J_m[(2\pi 30)^2 - (2\pi 29)^2]}{2}$$

and $$J_m = \frac{2(550)}{(60\pi)^2 - (58\pi)^2}$$

Such an arrangement for ensuring the availability of constant horsepower output irrespective of speed is, it will be noted, peculiar to the present invention. For instance, in what has been referred to as the normal type of electronic variable speed drive the addition of inertia to the motor armature is definitely detrimental since it tends to reduce the rate at which changes in the speed of rotation of the armature can be effected. Furthermore since it is rotating at the speed of the driven shaft it cannot simultaneously act as a storage system for kinetic energy and yet be rapidly responsive to desired changes in the speed of rotation.

Although I prefer the arrangements just described, some of the advantages of the present invention can be obtained by the use of the arrangement shown in Figure 3, in applications where only moderate power outputs are required.

Referring to Figure 3, 24 is the field element of a series wound D. C. motor and 25 is the armature element of such a motor. Field element 24 is secured by any suitable means, such as the recessed member 26, to the shaft 69 driven by the prime mover. Slip rings 27 and 28 serve to make electrical connections to the winding 30 of field element 24.

Similarly armature element 25 is mounted by any suitable means so that it will be free to rotate concentrically with field element 24 and may deliver the required amount of torque to the output shaft 12". Reversing switch 29 working in conjunction with reversing switch 22' serves to reverse the direction of the flux with respect to the current in the armature 25 to permit reversing the direction of rotation of output shaft 12" and makes the appropriate changes in the polarity of pilot generator 13.

Similar elements throughout the modifications as illustrated by the figures have the same numbers or corresponding primes of the same numbers since they serve substantially the same function in each arrangement.

In the arrangement of Figure 6 which shows the face of the "stator" corresponding to Figure 1, the U-shaped laminations 6 are surrounded on the outer side by a flat surface 70 which may be coextensive with the flat surface of the U-shaped laminations 6. The flat surface 70 may be opposed by a similar flat surface surrounding the laminations 4 on the driving plate 1 and coextensive with the surface of the laminations 4 and the inner plate 10, thereby providing interlocking frictional surfaces inwardly and outwardly of the position of the coil 7.

Having now described my invention, I claim:

1. A variable speed drive comprising a first shaft an independent driving source providing power for said first shaft, a second shaft adapted to be driven by the first shaft, a pair of opposing clutch plates mounted one on each of said shafts with means for permitting their motion together in opposing gripping relation, electromagnetic means for drawing said clutch plates together, means for energizing said electromagnetic means intermittently, comprising a gaseous control tube having a cathode, an anode and an alternating current power source in series therewith, a grid control element for said tube, means providing a direct current potential source applied to said grid controlled in potential magnitude by the velocity of said second shaft for permitting a flow of current only during successive similar portions of the alternating current cycle of said alternating power source for adjustably controlling the grip between said clutch plates.

2. A variable speed drive comprising a first shaft an independent driving source providing power for said first shaft, a second shaft adapted to be driven by the first shaft, a pair of opposing clutch plates mounted one on each of said shafts with means for permitting their motion together in opposing gripping relation, comprising an armature mounted in one clutch plate and an electromagnetic means mounted in the other clutch plate with one clutch plate having means providing a limiited motion longitudinally of said shaft means for energizing said electromagnetic means intermittently, comprising a gaseous control tube having a cathode, an anode and an alternating current power source in series therewith, a grid control element for said tube, means for providing in opposing relation a selected potential and a direct current potential source controlled in potential magnitude by the velocity of said second shaft to said grid for permitting a flow of current only during successive similar portions of the alternating current cycle of said alternating power source for adjustably controlling the grip between said clutch plates.

References Cited in the file of this patent

UNITED STATES PATENTS

| Number | Name | Date |
|---|---|---|
| Re. 14,282 | Morrison | Apr. 3, 1917 |
| 505,025 | Brown | Sept. 12, 1893 |
| 586,006 | De Bovet | July 6, 1897 |
| 741,471 | Eastwood | Oct. 13, 1903 |
| 907,462 | Coleman | Dec. 22, 1908 |
| 1,303,484 | Landon-Davies | May 13, 1919 |
| 1,784,504 | Tanner | Dec. 9, 1930 |
| 2,062,135 | Lilja | Nov. 24, 1936 |
| 2,214,901 | Griffin | Sept. 17, 1940 |
| 2,223,210 | Hefel | Nov. 26, 1940 |
| 2,277,284 | Winther | Mar. 24, 1942 |
| 2,353,107 | Winther | July 4, 1944 |
| 2,449,779 | Jaeschke | Sept. 21, 1948 |
| 2,462,624 | Fletcher | Feb. 22, 1949 |
| 2,524,222 | Grade | Oct. 3, 1950 |
| 2,541,182 | Winther | Feb. 13, 1951 |

FOREIGN PATENTS

| 4,849A | Great Britain | Feb. 27, 1906 |